(12) United States Patent  (10) Patent No.: US 8,509,724 B2
D'Amico et al.  (45) Date of Patent: Aug. 13, 2013

(54) SWITCHED BEAM ANTENNA WITH DIGITALLY CONTROLLED WEIGHTED RADIO FREQUENCY COMBINING

(75) Inventors: Valeria D'Amico, Turin (IT); Maurizio Fodrini, Turin (IT); Bruno Melis, Turin (IT); Alfredo Ruscitto, Turin (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 862 days.

(21) Appl. No.: 12/312,846

(22) PCT Filed: Nov. 29, 2006

(86) PCT No.: PCT/EP2006/011430
§ 371 (c)(1),
(2), (4) Date: Jan. 28, 2010

(87) PCT Pub. No.: WO2008/064696
PCT Pub. Date: Jun. 5, 2008

(65) Prior Publication Data
US 2010/0130150 A1  May 27, 2010

(51) Int. Cl.
*H04B 1/06*  (2006.01)
(52) U.S. Cl.
USPC .................. 455/273; 455/277.1; 455/276.1
(58) Field of Classification Search
USPC .............. 455/132, 143, 273, 277.1, 137, 139, 455/140, 205, 226.1, 266, 272, 275, 278.1; 375/267; 343/720, 725, 729
See application file for complete search history.

(56) References Cited

U.S. PATENT DOCUMENTS

| 4,278,978 | A | * | 7/1981 | Frosch et al. | 342/383 |
| 4,868,890 | A | * | 9/1989 | Lennartsson | 455/139 |
| 5,504,465 | A | | 4/1996 | Yung et al. | |
| 5,818,386 | A | * | 10/1998 | Belisle | 342/372 |
| 5,930,293 | A | | 7/1999 | Light et al. | |
| 5,982,825 | A | | 11/1999 | Tsujimoto | |
| 6,154,652 | A | | 11/2000 | Park et al. | |
| 6,175,327 | B1 | * | 1/2001 | Lin et al. | 342/357.64 |
| 6,259,730 | B1 | | 7/2001 | Solondz | |

(Continued)

FOREIGN PATENT DOCUMENTS

| EP | 1164718 A2 | 12/2001 |
| EP | 1267501 A2 | 12/2002 |

(Continued)

OTHER PUBLICATIONS

"(O)RLANS in the Frequency Band 2400-2483.5 MHz", Electronic Communications Committee (ECC) within the European Conference of Postal and Telecommunications Administrations (CEPT), ECC Report 57, pp. 1-17, (2004).

(Continued)

*Primary Examiner* — Dominic E Rego
(74) *Attorney, Agent, or Firm* — Finnegan, Henderson, Farabow, Garrett & Dunner, L.L.P.

(57) ABSTRACT

A wireless communication system, wherein a sub-set of radio frequency signals received from corresponding antenna elements is selected and combined into a single radio frequency signal, the single radio frequency signal being processed and demodulated in a single processing chain, includes a radio frequency phasing network for co-phasing the selected radio frequency signals before combining and a processor for controlling combining and phasing in order to obtain a single radio frequency signal having a radio performance indicator which satisfies predetermined conditions.

24 Claims, 4 Drawing Sheets

(56) References Cited

U.S. PATENT DOCUMENTS

| | | |
|---|---|---|
| 6,438,389 B1 | 8/2002 | Sandhu et al. |
| 6,470,186 B1* | 10/2002 | Whikehart et al. ......... 455/456.1 |
| 6,658,261 B1* | 12/2003 | Winters et al. ................ 455/504 |
| 6,658,269 B1 | 12/2003 | Golemon et al. |
| 6,907,272 B2 | 6/2005 | Roy |
| 6,917,597 B1 | 7/2005 | Schmidl et al. |
| 6,992,621 B2 | 1/2006 | Casas et al. |
| 7,054,397 B1* | 5/2006 | Kawanabe .................... 375/347 |
| 7,062,294 B1 | 6/2006 | Rogard et al. |
| 7,155,192 B2* | 12/2006 | Ghassemzadeh et al. . 455/277.1 |
| 7,403,748 B1* | 7/2008 | Keskitalo et al. ............. 455/101 |
| 7,433,713 B2 | 10/2008 | Haskell et al. |
| 7,450,907 B2 | 11/2008 | Shurvinton et al. |
| 7,653,149 B2 | 1/2010 | Strich et al. |
| 7,697,626 B2* | 4/2010 | Wang et al. ................... 375/267 |
| 8,185,161 B2* | 5/2012 | Haskell et al. ............. 455/562.1 |
| 8,189,715 B2* | 5/2012 | van Driest et al. ........... 375/316 |
| 2001/0016504 A1* | 8/2001 | Dam et al. .................... 455/562 |
| 2002/0137547 A1* | 9/2002 | Judson .......................... 455/562 |
| 2002/0187813 A1 | 12/2002 | Guo |
| 2002/0190790 A1 | 12/2002 | Cheng et al. |
| 2003/0236081 A1* | 12/2003 | Braun ........................... 455/273 |
| 2004/0087294 A1 | 5/2004 | Wang |
| 2004/0224655 A1 | 11/2004 | Petrov et al. |
| 2004/0234012 A1* | 11/2004 | Rooyen ......................... 375/347 |
| 2004/0266338 A1 | 12/2004 | Rowitch |
| 2005/0025271 A1 | 2/2005 | Molisch et al. |
| 2005/0143037 A1* | 6/2005 | Stratis et al. ................ 455/277.1 |
| 2005/0163270 A1 | 7/2005 | Akita et al. |
| 2005/0181831 A1 | 8/2005 | Doi |
| 2005/0227619 A1* | 10/2005 | Lee et al. ......................... 455/22 |
| 2005/0287692 A1 | 12/2005 | Kim et al. |
| 2006/0079221 A1* | 4/2006 | Grant et al. ................... 455/423 |
| 2006/0135097 A1* | 6/2006 | Wang et al. ................... 455/132 |
| 2007/0080886 A1* | 4/2007 | Thomas et al. ............... 343/824 |
| 2007/0093269 A1 | 4/2007 | Leabman |
| 2007/0111692 A1* | 5/2007 | Kuramoto et al. ......... 455/277.1 |
| 2007/0205943 A1* | 9/2007 | Nassiri-Toussi et al. ..... 342/377 |
| 2009/0046638 A1* | 2/2009 | Rappaport et al. ............ 370/329 |
| 2010/0322336 A1* | 12/2010 | Nabar et al. .................. 375/267 |
| 2011/0097992 A1 | 4/2011 | Goransson et al. |
| 2011/0261805 A1 | 10/2011 | Landry et al. |
| 2011/0274194 A1 | 11/2011 | Feher |
| 2011/0312269 A1 | 12/2011 | Judd et al. |
| 2012/0039410 A1 | 2/2012 | Feher |
| 2012/0069131 A1 | 3/2012 | Abelow |
| 2012/0099668 A1 | 4/2012 | Sakata et al. |

FOREIGN PATENT DOCUMENTS

| | | |
|---|---|---|
| EP | 1 475 904 A2 | 11/2004 |
| EP | 1487134 A1 | 12/2004 |
| EP | 1489758 A1 | 12/2004 |
| WO | WO 02/03568 A1 | 1/2002 |
| WO | WO 0203568 A1 | 1/2002 |
| WO | WO 03/055097 A3 | 7/2003 |
| WO | WO-2006/023247 A1 | 3/2006 |
| WO | WO 2006/023247 A1 | 3/2006 |
| WO | WO 2006/037364 A1 | 4/2006 |
| WO | WO 2007/019185 A2 | 2/2007 |
| WO | WO 2007/038969 A1 | 4/2007 |
| WO | WO 2008/064696 A1 | 6/2008 |

OTHER PUBLICATIONS

Fahmy et al.; "Ad Hoc Networks with Smart Antennas Using IEEE 802.11-Based Protocols", ICC 2002, 2002 IEEE International Conference on Communications, Conference Proceedings, pp. 3144-3148, (2002).

European International Search Report for International Application No. PCT/EP2007/011140, mailing date Oct. 28, 2008.

A. Wittneben, "A New Bandwidth Efficient Transmit Antenna Modulation Diversity Scheme for Linear Digital Modulation," ICC Conference, pp. 1630-1634, Geneva (May 1993).

S. Kim et al., "Time-Delay Phase Shifter Controlled by Piezoelectric Transducer on Coplanar Waveguide," IEEE Microwave and Wireless Components Letters, vol. 13, No. 1, pp. 19-20 (Jan. 2003).

J. Lee et al., CDMA Systems Engineering Handbook, pp. 256-262 (1998).

* cited by examiner

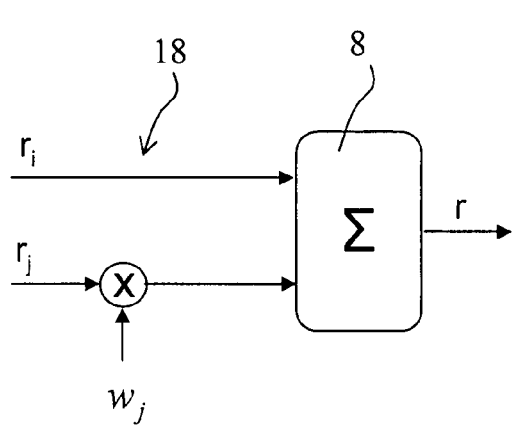
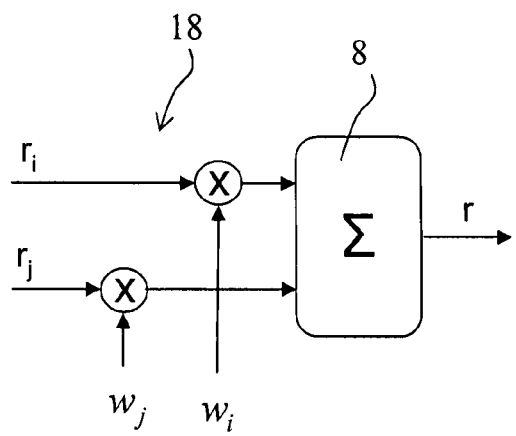
Fig. 6a              Fig. 6b
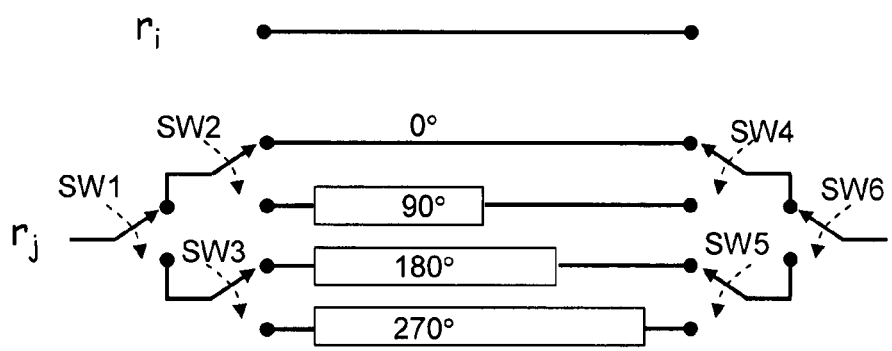
Fig. 7a
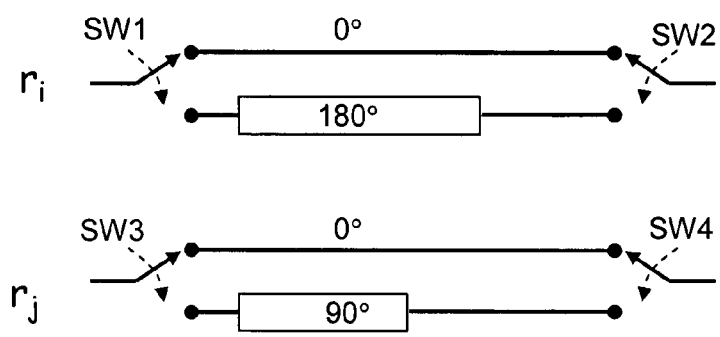
Fig. 7b

SWITCHED BEAM ANTENNA WITH DIGITALLY CONTROLLED WEIGHTED RADIO FREQUENCY COMBINING

CROSS REFERENCE TO RELATED APPLICATION

This application is a national phase application based on PCT/EP2006/011430, filed Nov. 29, 2006, the content of which is incorporated herein by reference.

FIELD OF THE INVENTION

The present invention relates in general to wireless communication systems, in particular to a method and an apparatus for recombining received/transmitted signals in a switched beam antenna. The present invention also relates to a Wireless Local Area Network (WLAN) device provided with a switched beam antenna with radio frequency combining of received/transmitted signals.

DESCRIPTION OF THE RELATED ART

A Wireless Local Area Network uses radio frequency (RF) signals to transmit and receive data over the air. WLAN systems transmit on unlicensed spectrum as agreed upon by the major regulatory agencies of countries around the world, such as ETSI (European Telecommunications Standard Institute) for Europe and FCC (Federal Communications Commission) for United States.

Wireless LANs allow the user to share data and Internet access without the inconvenience and cost of pulling cables through walls or under floors. The benefits of WLANs are not limited to computer networking. As the bandwidth of WLANs increases, audio/video services might be the next target, replacing device-to-device cabling as well as providing distribution throughout home, offices and factories.

Fundamentally, a WLAN configuration consists of two essential network elements: an Access Point (AP) and a client or mobile station (STA). Access points act as network hubs and routers. Typically, at the back end, an access point connects to a wider LAN or even to the Internet itself. At the front-end the access point acts as a contact point for a flexible number of clients. A station (STA) moving into the effective broadcast radius of an access point (AP) can then connect to the local network served by the AP as well as to the wider network connected to the AP back-end.

In WLAN deployment, coverage and offered throughput are impacted by several interacting factors that must be considered to meet the correspondent requirements. Wireless signals suffer attenuations as they propagate through space, especially inside buildings where walls, furniture and other obstacles cause absorption, reflections and refractions. In general the farther is the STA from the AP, the weaker is the signal it receives and the lower the physical rates that it can reliably achieve. The radio link throughput is a function of a number of factors including the used transmission format and the packet error rate (PER) measured at the receiver. A high PER may defeat the speed advantage of a transmission format with higher nominal throughput by causing too many retransmissions. However, WLAN devices constantly monitor the quality of the signals received from devices with which they communicate. When their turn to transmit comes, they use this information to select the transmission format that is expected to provide the highest throughput. In any case, on the average, the actual data rate falls off in direct relation to the distance of the STA from the AP.

Nowadays, high performance WLAN systems are required to provide high data rate services over more and more extended coverage areas. Furthermore, they have to operate reliably in different types of environments (home, office). In other words, future high performance WLAN systems are expected to have better quality and coverage, be more power and bandwidth efficient, and to be deployed in different environments.

Most current local area network equipment operates in the 2.4 GHz industrial, scientific and medical (ISM) band. This band has the advantage of being available worldwide on a license-exempt basis, but it is expected to congest rapidly. Thus, the spectrum regulatory body of each country restricts signal power levels of various frequencies to accommodate needs of users and avoid RF interference. Most countries deem wireless LANs as license free. In order to qualify for license free operation, however, the radio devices must limit power levels to relatively low values. In Europe, the Electronic Communications Committee (ECC) has defined a limiting condition in the ECC Report 57: "(O)RLANS in the Frequency Band 2400-2483.5 MHz", specifying the current regulations concerning the maximum allowed Equivalent Isotropic Radiated Power (EIRP). The limiting condition has been fixed so that the output power of the equipment results in a maximum radiated power of 100 mW EIRP or less. It follows that, depending on the type of antenna used, it might be necessary to reduce the output power of the equipment to result in a maximum radiated power of 100 mW EIRP or less. Combinations of power levels and antennas resulting in a radiated power level above 100 mW are considered as not compliant with national radio interface regulation.

The EIRP represents the combined effect of the power supplied to the antenna and the antenna gain, minus any loss due to cabling and connections:

$$\text{EIRP(dBm)} = P_{TX}(\text{dBm}) + G_{TX}(\text{dB}) - L_{TX}(\text{dB})$$

where $P_{TX}$ is the power supplied to the transmitting antenna, $G_{TX}$ is the antenna gain defined with respect to an isotropic radiator and $L_{TX}$ is the cabling loss.

Since the EIRP includes the antenna gain, this introduces a limitation to the kind of antennas that can be used at the transmitter. In order to employ an antenna with higher gain, the transmitted power must be reduced, so that the EIRP remains below 20 dBm.

Solutions to the coverage range enhancement problem, which are already known in literature, use system configurations that exploit multiple omni-directional antennas in which the different signals are demodulated separately by means of distinct radio frequency (RF) processing chains and subsequently recombined digitally at baseband (BB) level, as illustrated e.g. in U.S. Pat. No. 6,907,272 and in U.S. Pat. No. 6,438,389.

More advanced antenna architectures are based on the combination of multiple directional antennas. Among these systems, Switched Beam (SB) antenna architectures are based on multiple directional antennas having fixed beams with heightened sensitivity in particular directions. These antenna systems detect the value of a particular quality of service (QoS) indicator, such as for example the signal strength or the signal quality, received from the different beams and choose the particular beam providing the best value of QoS. The procedure for the beam selection is periodically repeated in order to track the variations of the propagation channel so that a WLAN RF transceiver is continuously switched from one beam to another.

An antenna apparatus with selectable antenna elements is illustrated in WO 2006/023247, which discloses a planar antenna apparatus comprising a plurality of individually selectable planar antenna elements, each of which has a directional radiation pattern with gain and with polarization substantially in the plane of the planar antenna apparatus. Each antenna element may be electrically selected (e.g., switched on or off) so that the planar antenna apparatus may form a configurable radiation pattern. If all elements are switched on, the planar apparatus forms an omnidirectional radiation pattern. The system may select a particular configuration of selected antenna elements that minimizes interference of the wireless link or that maximizes the gain between the system and the remote device.

OBJECT AND SUMMARY OF THE INVENTION

The Applicant has observed that in the solutions exploiting multiple RF processing chains for demodulating signals received by multiple antenna elements, the antennas are generally spaced in such a way to guarantee that the received signals are independent, thus introducing a spatial diversity gain together with an array gain obtained thanks to the coherent combining of the signals received from the different antennas. The drawback of such solutions resides in the receiver complexity, and correspondent costs, which are related to the introduction of a plurality of RF processing chains.

The Applicant has also observed that, as regards solutions exploiting selectable antenna elements, the large overall gain values obtained, on the receiving side, may become critical when the same antenna configuration is used in a WLAN client or access point on the transmitting side, due to the aforementioned EIRP limitations. Such systems are typically aimed to increase the range, neglecting limitations due to regional power limitation regulations. Thus a reduction of the transmitted power must be eventually introduced, leading to a loss of part of the overall performance enhancement.

The Applicant has tackled the problem of enhancing the coverage range of a switched beam antenna while fulfilling regulations concerning limitations on the power emissions.

In particular, the Applicant has tackled the problem of providing a switched beam antenna which is compliant with the EIRP limitation and, at the same time, increases the coverage range of a WLAN. An increased coverage range may contribute in decreasing installation costs, because of the need of a reduced number of access points.

The Applicant has found that this problem can be solved by selecting, in a switched beam antenna, at least two beams providing two corresponding RF signals which are co-phased and recombined in a single RF signal, for being demodulated in a single modem. Co-phasing and recombining comprises a multiplication of at least one of the signals for a complex-valued weight and combining by means of an adder. The same weights are used in transmission for weighting two separate signals which are obtained from a single RF signal to be transmitted by means of a splitter that divides it into two separate signals with the same power level.

The selection of the beams and the complex-valued weights to be used in the co-phasing operation are chosen with the goal of maximizing a radio performance indicator, or a combination of different indicators, such as the Received Signal Strength Indicator RSSI, the throughput or by minimizing the PER of the combined signal.

The switched beam antenna according to the present invention is able to enhance the overall coverage range, fulfilling the regional regulations concerning limitations on the power emissions, with a smaller reduction of the transmitted power. In particular, such antenna architecture can be exploited by a WLAN client both in the downlink direction (i.e. the Access Point is transmitting and the WLAN client is receiving) and in the uplink direction (i.e. the WLAN client is transmitting and the Access Point is receiving).

As the weighted combining of the signals is performed at RF, this solution requires generally no modifications within the modem receiver and hence can be easily applied on existing WLAN clients as an add-on device.

BRIEF DESCRIPTION OF THE ANNEXED DRAWINGS

Further features and advantages of the present invention will be made clearer by the following detailed description of some examples thereof, provided purely by way of example and without restrictive intent. The detailed description will refer to the following figures, in which:

FIGS. 6a and 6b show two alternative RF phasing circuits for the system of FIG. 1;

FIGS. 7a and 7b show two possible implementations for the RF phasing networks of FIGS. 6a and 6b;

DETAILED DESCRIPTION OF PREFERRED EMBODIMENTS OF THE INVENTION

Figure 1:
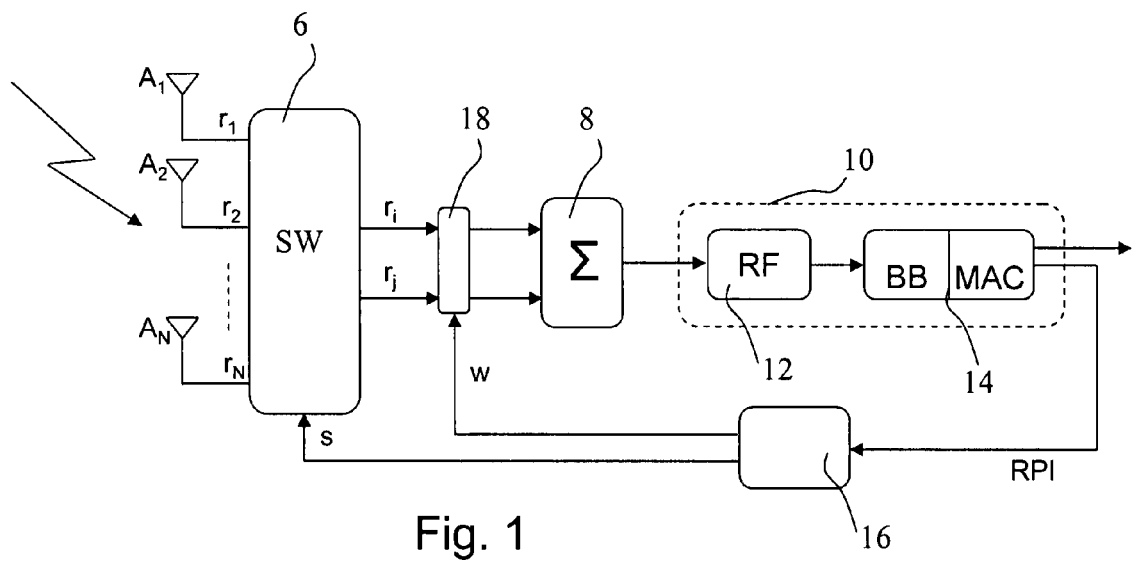
FIG. 1 illustrates schematically a switched beam antenna system realised according to the present invention employed in the downlink direction.

With reference to FIG. 1, a multiple directional antenna system according to the present invention comprises a plurality of directional antennas $A_1 \ldots A_N$ which are deployed in such a way that almost all the possible directions of arrival of the received signal are covered. In a typical configuration, shown schematically in FIG. 2, eight antennas $A_1 \ldots A_8$ are used in order to cover the entire azimuth plane. Each antenna has a radiation pattern shown in figure as a lobe having gain G0.

Signals $r_1 \ldots r_N$ from antennas $A_1 \ldots A_N$ are fed to a RF switching network 6 that allows the selection, by means of selection signal S, of a sub-set of signals, in particular two (or more than two) strongest beams providing the signals $r_i$ and $r_j$ that maximize a given radio performance indicator, as explained in detail hereinafter. This decision is made in block 16 at base-band (BB) level by measuring one or more radio performance indicator RPI provided by a modem receiver 10, such as for example the Received Signal Strength Indicator (RSSI), the throughput or the Packet Error Rate (PER). A suitable recombination technique, applied at RF, is then performed on the signals $r_i$, $r_j$ selected by the switching network. The recombined signal is then sent to a single RF processing chain 12 and demodulated through a conventional modem 14 which carries out the BB and MAC receiving operations.

The recombination technique, referenced hereinafter as Weighted Radio Frequency (WRF) combining, operates as follows. The two (or in general the sub-set) selected signals $r_i$ and $r_j$ are first co-phased, in block 18, by means of a multiplication operation for appropriate complex-valued weights, referenced globally by signal W in FIG. 1, and then added together in a combiner 8. In fact, as the signal propagation takes place generally through multiple directions of arrival (DOA), such recombination technique, performed at RF, gives a reduction of fading and produces an output signal with a better quality, even when none of the individual signals of the different directions of arrival (DOA) are themselves acceptable. This is obtained by weighting the signals from different directions of arrival (two in the embodiment described herein but in general a subset of all directions) according to an appropriate complex value, co-phasing them individually and finally summing them together. The information will hence be gathered from the selected directions of arrival, each of which gives its own weighted contribution to the output signal.

The complex-valued weights W and the selection of the sub-set of beams, to be used in the co-phasing operation, are chosen with the goal of obtaining a radio performance indicator RPI comprised within a predetermined range, e.g. maximizing a particular indicator, or a combination of different indicators, such as the RSSI or the throughput, or by minimizing the PER of the combined signal.

With particular reference to a first preferred embodiment, shown in FIG. 6a, which illustrates a first version of the RF phasing circuit 18 of the system of FIG. 1, when two signals $r_i$ and $r_j$ are selected after the switching network, one of the two signals $r_i$ is maintained as it is and the other $r_j$ is co-phased by a complex-valued weight $w_j$ with unitary modulus. The two signals are then recombined in block 8 and sent to the single RF processing chain 12 and demodulated through the modem 14 which carries out the BB and MAC receiving operations, as shown in FIG. 1.

Figure 2:
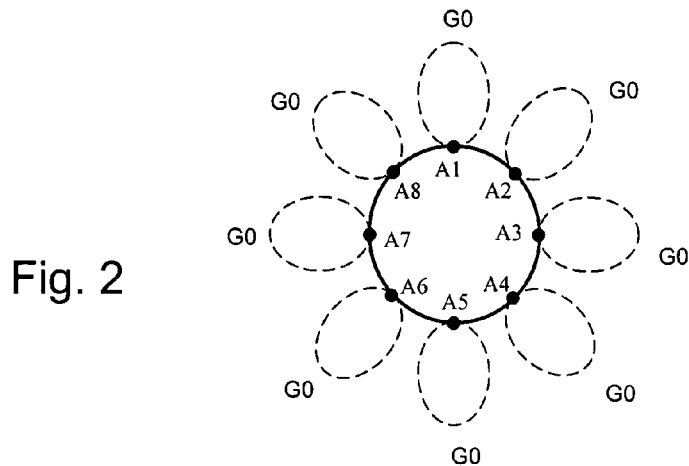
FIG. 2 illustrates a spatial antenna configuration for the antenna system of FIG. 1.
Figure 3:
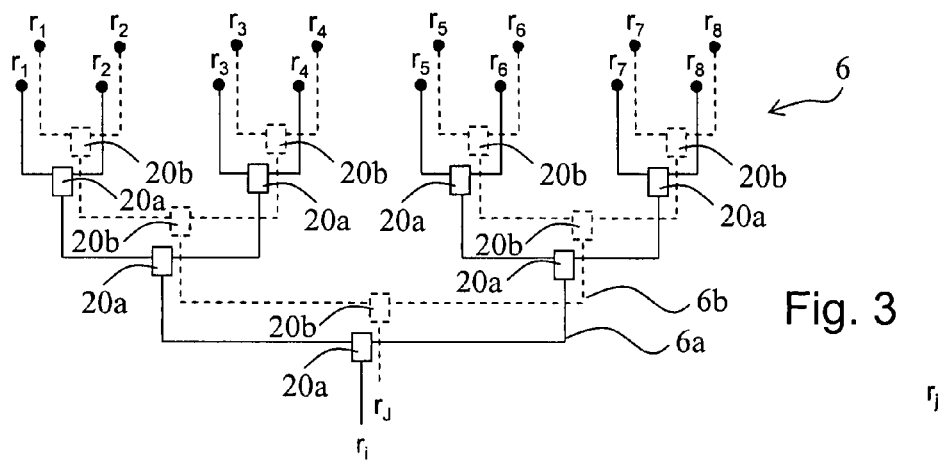
FIG. 3 shows schematically a switching network for the antenna system of FIG. 1.

According to a particular embodiment of the invention, considering the configuration of eight antennas shown in FIG. 2 the switching network 6 is realized as schematically shown in FIG. 3. Two symmetrical switching sub-networks 6a and 6b, having an "8 to 1" configuration, are fed with same signals $r_1 \ldots r_8$ coming from antennas $A_1 \ldots A_8$, resulting in an "8 to 2" switching network scheme. Each sub-network 6a, 6b has a plurality of switches, indicated altogether in FIG. 3 by references 20a and 20b, allowing to select, in each network, any of input signal $r_1 \ldots r_8$. Any combination of output signals $r_i$, $r_j$ can thus be selected by the switching network 6.

The beam selection technique, performed by block 16, operates, according to a preferred embodiment, as follows. Eight pairs of signals $r_i$, $r_j$, derived from the eight different antennas, are subsequently selected by means of the switching network 6 and sent to the RF phasing circuit 18, in particular the phasing circuit shown in FIG. 6a. In particular the pairs of signals are sent in the following order: $(A_1, A_2)$, $(A_2, A_3)$, $(A_3, A_4)$, $(A_4, A_5)$, $(A_5, A_6)$, $(A_6, A_7)$, $(A_7, A_8)$, $(A_8, A_1)$ and, for each pair, a certain radio performance indicator, or a combination of different indicators (such as the RSSI, the throughput or the PER of the combined signal) is measured. In particular, in this first step, no phasing operation is introduced, hence $w_j=\exp(-j\cdot 0)$. It follows that, at this step, the signals received from the switching network are simply added together by adder 8 without introducing any phase modification. Once the above eight radio performance indicator measurements have been calculated, the two pairs of beams $(A_i, A_j)$ and $(A_h, A_k)$, providing the best two performance indicator values, are selected and the related received signals are identified.

The next step is to provide the above four optimal signals (related to the two optimal pairs of beams) at the input of the circuit shown in FIG. 6a in all the possible six different combinations $(A_i, A_h)$, $(A_i, A_k)$, $(A_j, A_h)$, $(A_j, A_k)$, $(A_i, A_j)$, $(A_h, A_k)$ and with all the four possible weights $w_i=\exp(-j\cdot\beta)$ corresponding to the quantized phase values chosen from the following set: $\beta\in\{0°, 90°, 180°, 270°\}$, as detailed in the following with reference to FIG. 7a. Once again, twenty-four radio performance indicator measurements are evaluated, and the optimal pair of signals together with the related optimal weights, corresponding to the maximum values of the radio performance indicator, is selected to complete the procedure, thus obtaining optimal beam selection signal S and weight(s) W from decision block 16.

According to an embodiment of the present invention, the complex-valued weights with unitary modulus can be introduced in a quantized form in order to use only a limited set of values. In particular, in order to define a quantization step providing a good trade-off between performance and complexity, we have supposed to divide the entire azimuth plane of 360° in a certain number L of quantized angular values corresponding to multiples of a certain elementary angle resolution with a value $\alpha=360°/L$. It is evident that the L quantized angular values can be represented, with a binary notation, on a certain number of bits equal to $\log_2(L)$.

This elementary angle resolution $\alpha$ represents the discrete step to be applied at RF level in order to co-phase one of the two selected signals. In the case of unitary modulus complex-valued weight w, an optimal number L of quantized angular values introducing the phase shift, necessary for the co-phasing operation, can be chosen, for example, by optimizing the performance, in terms of PER, computed on the combined signal.

In Table 1 the values of PER, evaluated in correspondence of C/N=10 dB, for a 12 Mbps physical layer data rate service, transmitted over a typical home environment propagation channel model (MIMO Model B channel model) are summarized as a function of the elementary angle resolution $\alpha=360°/L$. It is possible to observe that angle resolutions of 90° or 45° are a good trade-off between complexity (2 or 3 bits for the quantization of the phase shift value) and performance in terms of PER.

TABLE 1

PER performance for different phase shift angle resolutions.

| Number L of Quantized Angular Values | Number of Bits | Angle Resolution α [deg] | PER |
|---|---|---|---|
| 256 | 8 | 1.4° | 0.049 |
| 128 | 7 | 2.8° | 0.049 |
| 64 | 6 | 5.6°° | 0.049 |
| 32 | 5 | 11.2° | 0.049 |
| 16 | 4 | 22.5° | 0.050 |
| 8 | 3 | 45° | 0.052 |
| 4 | 2 | 90° | 0.056 |
| 2 | 1 | 180° | 0.097 |

Figure 4:
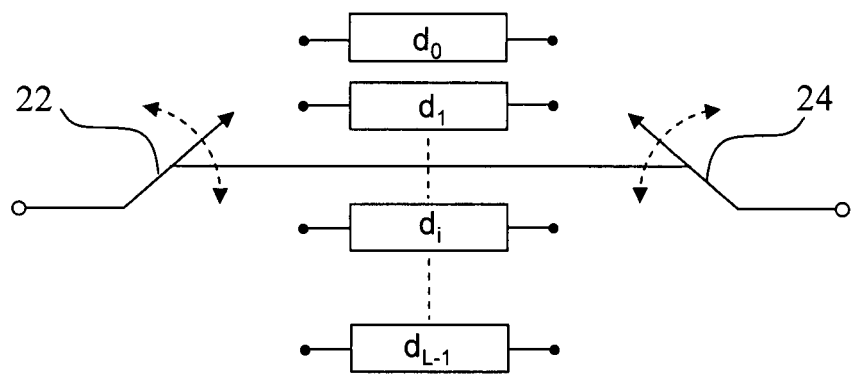
FIG. 4 shows a RF phasing network according to an aspect of the present invention.

The discrete phase shift step, to be applied at RF level in order to co-phase one of the two selected signals, can be obtained, for example, by exploiting a suitable RF co-phasing network that, for example, can be implemented according to the scheme shown in FIG. 4. The implementation of the RF co-phasing network, shown in FIG. 4, can be, for instance, realized by means of two switches 22, 24 with single input and L outputs (each switch is realised e.g by means of a PIN diode network) and L delay lines with different lengths introducing, on the received signal, a delay $d_i$ which is related to the correspondent value of RF phase rotation $w_i$ by the following equation $$w_i = \exp(-j \cdot 2 \cdot \pi \cdot d_i / \lambda) \text{ for } i=0, \ldots, L-1 \quad (1)$$

where $\lambda$ is the wavelength of the signal carrier.

From equation (1) it follows that, in order to obtain quantized phase shift values corresponding to multiples of a certain elementary angle resolution $\alpha = 360°/L$ so that $w_i = \exp(-j \cdot \phi_i)$ with $\phi_i = 360°/L \cdot i$ and $i = 0, 1, 2, \ldots L-1$, it is necessary to employ values $d_i$ of delay given by the following equation $$d_i = \lambda / L \cdot i \text{ for } i=0, \ldots, L-1 \quad (2)$$

Figure 5:
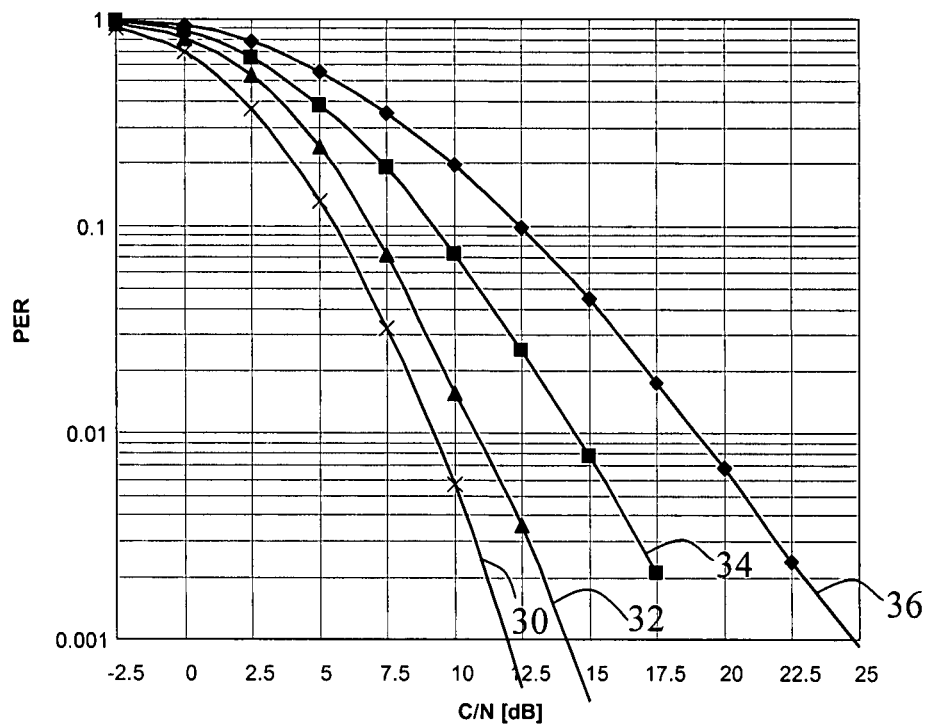
FIG. 5 illustrates in a diagram a performance comparison between antenna architectures according to reference designs and the present invention.

A performance comparison in the downlink direction (i.e. the Access Point is transmitting and the WLAN client is receiving) of different antenna architectures is shown in FIG. 5. Without loss of generality a 12 Mbps physical layer data rate service has been considered. Transmission is referred to typical home environment propagation conditions. It is possible to observe that the switched beam antenna according to the present invention, curve 30, achieves a gain, in terms of signal-to-noise ratio (C/N), of about 1-2 dB with respect to a reference Switched Beam antenna, curve 32, in the range of PER values comprised in between 0.01 and 0.001, when adopting an elementary phase shift value quantized over 2 bits. Curve 32 refers in fact to a reference Switched Beam (SB) antenna architecture, based on multiple directional antennas, wherein the value of a particular quality of service (QoS) indicator received from the different antennas, such as for example the signal strength, is periodically monitored and the beam providing the best value of QoS is selected. Curve 34 refers to a reference antenna architecture having two antennas and a RF switching circuit for periodically selecting the antenna providing a strongest signal, while curve 36 refers to a prior art antenna architecture having a single antenna.

The antenna architecture according to the invention, while providing a performance improvement, advantageously requires only one RF processing chain, thus reducing the required complexity and related costs. Moreover, as no substantial modifications are required within the modem receiver 10, this solution can be applied on existing WLAN clients as an add-on device, reducing the required costs in the related deployment.

With reference to a second preferred embodiment, shown in FIG. 6b which illustrates a second version of the RF phasing circuit 18 of the system of FIG. 1, both signals $r_i$ and $r_j$ are weighted by the weights $w_i$ and $w_j$ respectively. In this case the signal at the output of the co-phasing network 18 and combining network 8 can be expressed as follows $$r = r_i \cdot w_i + r_j \cdot w_j$$

where the weighting factors can be expressed as complex phase shift weights $$w_i = e^{j\alpha} \; w_j = e^{j\beta}$$

and the signals at the output of the RF switching network can be expressed considering, for simplicity, only the phase term $$r_i = e^{j\theta_1} \; r_j = e^{j\theta_2}$$

The combined signal is then expressed as follows $$r = e^{j\theta_1 + \alpha} + e^{j\theta_2 + \beta}$$

In order to coherently combine the two signals the following condition must be fulfilled $$\theta_1 + \alpha = \theta_2 + \beta \Rightarrow \theta_2 - \theta_1 = \alpha - \beta$$

As the phases of the two selected signals $\theta_1$ and $\theta_2$ are independent, it follows that the difference between the two phase weights $\alpha$ and $\beta$ must cover all the possible angles between 0° and $360 \cdot (L-1)/L$ $$\alpha - \beta \in \left[ 0°; \frac{360°(L-1)}{L} \right]$$

Several choices are possible for the phase weights $\alpha$ and $\beta$. For example if L=4, it is possible to use the following two phase sets $$\alpha = \{0°, 180°\} \; \beta = \{0°, 90°\}$$

Notice that the difference between $\alpha$ and $\beta$ takes a set of values that covers all the possible angles between 0° and $360 \cdot (L-1)/L$ $$\alpha - \beta = \{0°, 90°, 180°, -90°\} = \{0°, 90°, 180°, 270°\}$$

An advantage of the configuration shown in FIG. 6b, when compared to the configuration shown in FIG. 6a, is a reduction of the complexity of the RF switching network. A comparison in terms of number of RF switches for L=4 is given in FIGS. 7a and 7b. We may notice that the configuration in FIG. 7a, in which the phase shift is applied only on one signal $r_j$, requires 6 RF switches SW1 ... SW6 with 1 input and 2 outputs. On the contrary, the configuration in which the phase shift is applied on both signals $r_i$ and $r_j$ requires only 4 RF switches SW1 ... SW4 with 1 input and 2 outputs. In general, as the value of L increases, the reduced complexity of configuration 6b becomes more relevant.

Under the hypothesis of ideal channel reciprocity, i.e. the uplink transmission channel is equivalent to the downlink transmission channel, when using a reference Switched Beam WLAN client, the uplink propagation path and the downlink propagation path can be assumed to have similar characteristics if the same beam is used for the reception and transmission links. Thus the gain $G_{DL}$, with respect to a single antenna WLAN client, achieved during the downlink reception when the WLAN client is equipped with a reference Switched Beam antenna architecture can be assumed true also when the same WLAN client is used as a transmitter in the uplink direction, gain $G_{UL}$, and the transmission occurs from the beam that has been previously selected during the downlink reception.

Nevertheless we must recall that, during the transmission of the WLAN client in the uplink direction, the specified EIRP maximum emission conditions must be fulfilled. Thus a reduction of the transmitted power by a factor equal to $P_{red}$ has to be introduced. The reduction of the transmitted power affects the gain on the uplink direction. The above considerations lead to the following equations:

$$G_{DL} = G_{dB} \quad (3)$$

$$G_{UL} = G_{DL} - P_{red} \quad (4)$$

$$P_{red} = P_{client} + G_{ant} - 20 \text{ dBm} \quad (5)$$

where $G_{ant}$ is the gain of the single directional antenna employed and $P_{client}$ is the transmission power of the WLAN client. A typical value for $P_{client}$ is between 16 and 18 dBm and $G_{ant}$ values vary between 6 dB and 10 dB. It is evident that these values lead to a power emission, given by $P_{client} + G_{ant}$, that clearly exceeds the 20 dBm limit. If we suppose, for instance, a value of $G_{ant}$ equal to 8 dB and a value of $P_{client}$ equal to 17 dBm, in the absence of cables loss, the EIRP transmitted by the WLAN client is equal to 25 dBm that exceeds the 20 dBm limit. In this particular case a power reduction $P_{red}$ equal to 5 dB has to be introduced. According to equation (4) it is possible to conclude that, because of the power reduction $P_{red}$, the gain on the uplink direction $G_{UL}$ is correspondently reduced by a factor equal to 5 dB.

Figure 8:
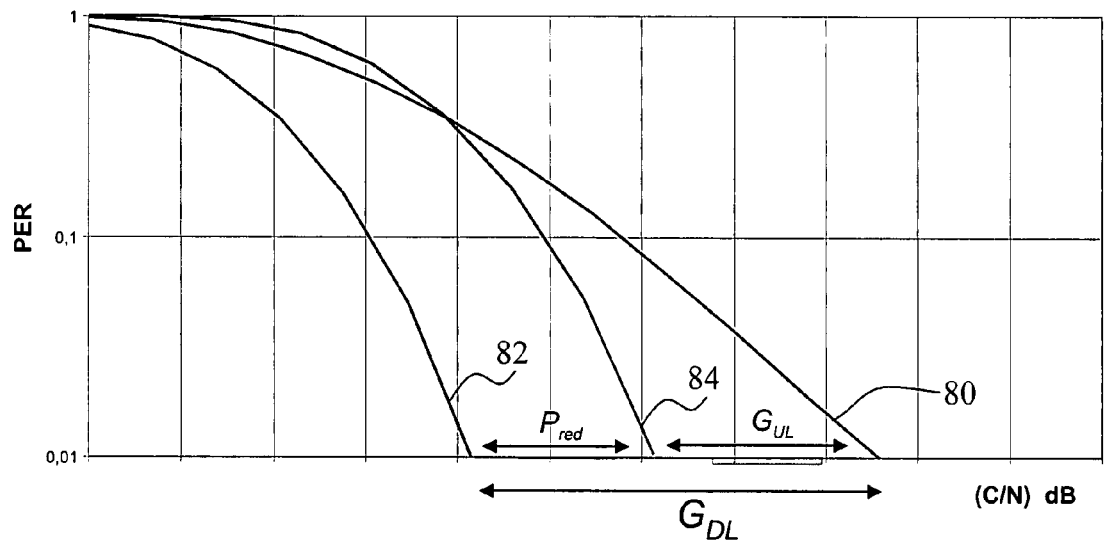
FIG. 8 illustrates power reduction, downlink and uplink gains in a reference switched beam antenna.

The above considerations are summarized in FIG. 8, wherein curves 80, 82 and 84 represent packet error rates PER as a function of signal-to-noise ratio (C/N) for, respectively, a single antenna architecture, a reference Switched Beam (SB) antenna in downlink and a reference Switched Beam antenna in uplink. In order to achieve a given target PER the performance enhancement $G_{DL}$, gained in the downlink transmission by adopting a reference Switched Beam antenna instead of a single antenna receiver, is reduced by a factor equal to $P_{red}$ in the uplink direction because of the compliance with the EIRP limitation.

It is important to observe that the overall coverage range extension obtained is given by the minimum between the coverage range extension obtained on the downlink and uplink path. Since the downlink and uplink coverage ranges are strictly dependent on the correspondent values of gain $G_{DL}$ and $G_{UL}$ we can define the overall gain $G_{SB}$ of a reference Switched Beam antenna with respect to a single antenna transceiver as follows $$G_{SB}=\min(G_{DL}, G_{UL}) \quad (6)$$

If we combine now equation (6) with equation (4) we conclude that $G_{SB}$ is given by $$G_{SB}=G_{UL}=G_{DL}-P_{red} \quad (7)$$

As a consequence, when using WLAN clients equipped with a reference Switched Beam antenna architecture, the limiting link in terms of coverage is the uplink direction because of the reduction of the transmission power required in order to satisfy emission limitations.

In existing WLAN configurations, the clients typically use a single omni-directional antenna in the transmission towards the access point. Transmit diversity techniques can, instead, be used in the transmission path from the access point to the client (downlink). In these systems omni-directional antennas are used in order not to exceed the power emission limitations.

Figure 9:
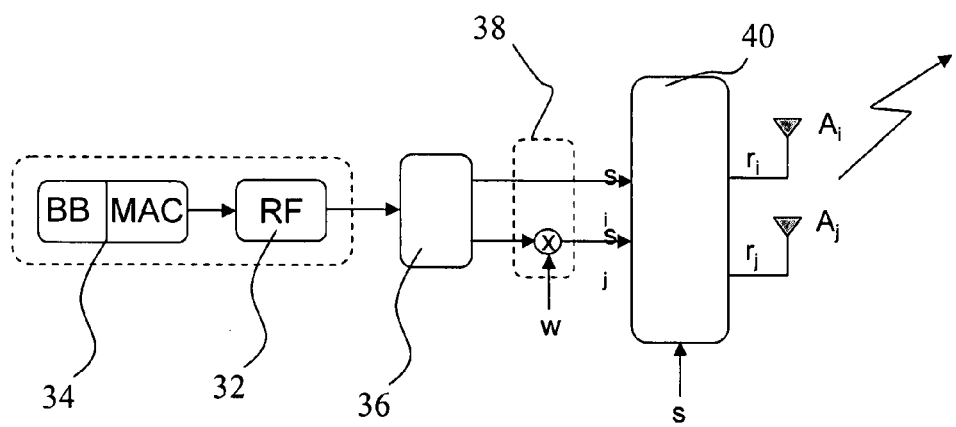
FIG. 9 illustrates schematically a switched beam antenna system realised according to the present invention employed in the uplink direction.

The switched beam antenna architecture according to the present invention, with WRF combining and single RF processing chain, described above with reference to FIG. 1, can also be used in the uplink direction during the transmission from the WLAN client to the Access Point, as shown schematically in FIG. 9.

The configuration shown in FIG. 9 is based on the same antenna architecture employed in the downlink direction, realized with a certain number of directional antennas which are deployed in a way that all the possible Directions of Departure (DOD) of the transmitted signal are covered. During the uplink transmission two antennas $A_i$ and $A_j$ (or in general a sub-set of antennas), selected by means of beam selector 30 among all the directional antennas $A_1 \ldots A_N$ in correspondence of the two strongest received signals during the downlink reception, are used for transmission. In similar way the value of the complex weight w selected during the downlink reception is employed also for uplink transmission.

In particular, after the conventional BB and MAC modem 34 and the single RF processing chain 32, the signal to be transmitted is sent to a splitter 36 that divides it into two (or in general a plurality of) separate signals with the same power level, that is equal, in dBm, to $P_{client}$–3 dB. Thanks to the hypothesis of channel reciprocity, one of the two signals is digitally weighted exploiting the complex-valued weight w evaluated during the downlink reception, in phasing block 38. This enables the signals reaching the access point to be coherently recombined at the receiver end, leading to performance enhancement.

In any case the main benefit of this solution resides in the fact that the power transmitted from each of the two antennas of the antenna architecture according to the present invention is equal to half of the power transmitted by the single antenna of a reference Switched Beam antenna. This means that, in order to be compliant with the EIRP limitation, the power transmitted by each of the two antennas has to be reduced by the following quantity $$P_{red}=P_{client}-3 \text{ dB}+G_{ant}-20 \text{ dBm} \quad (8)$$

If we compare now the power reduction to be employed in the reference SB antenna, defined in equation (4), with the power reduction to be employed in the SB antenna matter of the present invention defined in equation (8), we observe that, in the latter system, thanks to the fact that, for the transmission two directional antennas fed with half of the overall transmission power of the client are employed, the value of the power reduction is 3 dB smaller than the correspondent value to be employed in the former system. This is obtained thanks to the hypothesis that the overall power in each point of the azimuth plane does not overcome the maximum emission power of the single radiation element of the antenna system that has been dimensioned in order to satisfy the power emission limitations.

Since the gain in the uplink direction $G_{UL}$ is related to the gain in the downlink direction $G_{DL}$ by equation (4) we observe that a smaller reduction of the transmission power corresponds to a higher value of the uplink gain $G_{UL}$ and, in turn, to a larger value of the overall antenna gain $G_{SB}$ as defined in equation (7).

Therefore, the switched beam antenna architecture according to the present invention, thanks to the higher gain on the downlink direction $G_{DL}$ and to the larger power transmitted by each of the two directional antennas, has better performance, in terms of overall antenna gain $G_{SB}$ and therefore in terms of coverage range extension, with respect to a reference Switched Beam antenna.

In case the second version of the RF phasing circuit 18, the circuit of FIG. 6b, is used at the receiver, wherein both signals $r_i$ and $r_j$ are weighted by the weights $w_i$ and $w_j$ respectively, both signals coming from the splitter 36 are digitally weighted exploiting the complex-valued weights $w_i$ and $w_j$ evaluated during the downlink reception.

The application of the switched beam antenna with WRF combining is not limited to WLAN systems but can be also envisaged for cellular systems as, for example, third generation (3G) mobile communication systems. Examples of possible application are the evolution of the UMTS and CDMA2000 radio interfaces denoted respectively as HSDPA (High Speed Downlink Packet Access) and 1×EV-DO (EVolution, Data-Optimized). These two transmission technologies are optimized for the provision of high speed packet data services in downlink, including mobile office applications, interactive games, download of audio and video contents, etc. The switched beam antenna architecture according to the invention can be easily integrated in an HSDPA or 1×Ev-DO modem in order to provide benefits in terms of average and peak throughput with respect to a conventional modem equipped with one omnidirectional antenna.

The benefits of the switched beam antenna according to the invention are twofold. A first benefit is the reduction of the inter-cell interference obtained through the spatial filtering of the signals transmitted by the interfering cells. By using a directional antenna system it is possible to maximize the signal received from the serving cell and at the same time minimize the interfering signals arriving from the other directions. A reduction of the inter-cell interference corresponds to an increment of the geometry factor G, defined as the ratio between the power of the signal received from the serving cell and the power of the signals received from the interfering cells. The users near to the cell edge typically face a low value of the geometry factor and thus the switched beam antenna can provide significant benefits in terms of throughput.

A second benefit of the switched beam antenna is obtained for users near to the serving base station. For these users the inter-cell interference is minimal but the link performance is degraded by the intra-cell interference caused by the other channels (common and dedicated) transmitted by the serving base station. This self interference is a consequence of the multipath propagation that reduces the orthogonality among the different spreading codes. The utilization of the switched beam antenna reduces the delay spread and consequently increases the orthogonality of the propagation channel. The effect of the switched beam antenna is equivalent to an equalization of the channel frequency response in the spatial domain that reduces the intra-cell interference and thus brings an increment of the data throughput.

The invention claimed is:

1. A wireless communication system comprising:
   a plurality of antenna elements;
   a selector for selecting a sub-set of received radio frequency signals from said antenna elements;
   a combiner for combining said sub-set of received radio frequency signals into a single radio frequency signal;
   a processing chain for processing and demodulating said single radio frequency signal and for generating at least a radio performance indicator representative of the quality of said single radio frequency signal;
   a processor detecting said radio performance indicator for generating a selection signal(s) for said selector and a phase shift signal for said radio frequency phasing network in order to obtain a single radio frequency signal having a radio performance indicator within a predetermined range; and
   a radio frequency phasing network for co-phasing said selected radio frequency signals before combining in said combiner by applying a phase shift to at least one signal in said sub-set.

2. The system according to claim 1, wherein said selector selects two received radio signals.

3. The system according to claim 2, wherein said radio frequency phasing network applies a phase shift to said two selected radio frequency signals.

4. The system according to claim 2, wherein said phase shift signal and said selection signal(s) are used, in transmission, for phasing at least two signals to be transmitted and for selecting at least two antenna elements, respectively.

5. The system according to claim 4, wherein two signals to be transmitted are obtained by splitting a single signal into two separate signals with a same power level.

6. The system according to claim 1, wherein said radio performance indicator is an indicator selected from the following group or a combination thereof:
   received signal strength indicator,
   the throughput, and
   the packet error rate.

7. The system according to claim 6, wherein a selection signal(s) and a phase shift signal are generated in order to maximize the received signal strength indicator or the throughput or a combination of them.

8. The system according to claim 6, wherein a selection signal(s) and a phase shift signal are generated in order to minimize the packet error rate of said single radio frequency signal.

9. The system according to claim 1, wherein said phase shift is applied by multiplying a signal by a complex-valued weight having unitary modulus.

10. The system according to claim 9, wherein said phase shift is applied in quantized form.

11. The system according to claim 10, wherein said phase shift is applied by means of a plurality of delay lines selectively switched.

12. A method of processing a radio frequency signal in a radio communication system, said signal being received by a plurality of antenna elements, comprising the steps of:
    selecting a sub-set of received radio frequency signals from said antenna elements;
    combining said sub-set of received radio frequency signals into a single radio frequency signal;
    processing and demodulating said single radio frequency signal for generating at least a radio performance indicator representative of the quality of said single radio frequency signal;
    subjecting signals in said sub-set of received radio frequency signals to co-phasing, by applying a phase shift to at least one signal in said sub-set;
    detecting said radio performance indicator; and
    selecting a combination of sub-set of received radio frequency signals and a phase shift for said co-phasing step, in order to obtain a single radio frequency signal having a radio performance indicator within a predetermined range.

13. The method according to claim 12, wherein said selecting a combination comprises selecting two received radio frequency signals.

14. The method according to claim 13, wherein said co-phasing comprises applying a phase shift to said two selected radio frequency signals.

15. A method according to claim 13, wherein said selecting a combination comprises:
    subsequently selecting pairs of received radio frequency signals and, for each pair, measuring said radio performance indicator;
    selecting two pairs of signals providing higher radio performance indicator values;
    subjecting the six possible different combination pairs of the four signals in said two pairs to different phase shifts;
    measuring for each combination pair and for each phase shift said radio performance indicator in order to obtain a single pair of received radio frequency signals corresponding to a higher value of said radio performance indicator.

16. The method according to claim 15, wherein in said step of selecting the two pairs of signals providing higher radio performance indicator values, no phase shift is applied to said pairs of signals.

17. The method according to claim 12, wherein said radio performance indicator is an indicator selected from the following group or a combination thereof:
    received signal strength indicator,
    the throughput, and
    the packet error rate.

18. The method according to claim 17, wherein said combination of sub-set of received radio frequency signals and phase shift for said co-phasing step is selected in order to maximize the received signal strength indicator or the throughput or a combination of them.

19. The method according to claim 17, wherein said combination of sub-set of received radio frequency signals and phase shift for said co-phasing step is selected in order to minimize the packet error rate of said single radio frequency signal.

20. The method according to claim 12, wherein said phase shift is applied by multiplying a signal by a complex-valued weight having unitary modulus.

21. The method according to claim 20, wherein said phase shift is applied in quantized form.

22. The method according to claim 12, wherein said combination of sub-set of received radio frequency signals and phase shift for said co-phasing step are used, in transmission, for phasing at least two signals to be transmitted and for selecting at least two antenna elements, respectively.

23. The method according to claim 22, wherein two signals to be transmitted are obtained by splitting a single signal into two separate signals with the same power level.

24. A wireless local area network device comprising a wireless communication system according to claim 1.

* * * * *